(12) United States Patent
Min et al.

(10) Patent No.: US 11,645,778 B2
(45) Date of Patent: May 9, 2023

(54) APPARATUS AND METHOD FOR IDENTIFYING AND PICKING OBJECT USING ARTIFICIAL INTELLIGENCE ALGORITHM

(71) Applicant: SAMSUNG ELECTRONICS CO., LTD., Suwon-si (KR)

(72) Inventors: Jun Hong Min, Suwon-si (KR); Soon Yong Park, Suwon-si (KR); Ji Min Kim, Suwon-si (KR); Kyung Shik Roh, Suwon-si (KR); Wook Bahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 16/767,421

(22) PCT Filed: Nov. 6, 2018

(86) PCT No.: PCT/KR2018/013345
§ 371 (c)(1),
(2) Date: May 27, 2020

(87) PCT Pub. No.: WO2019/124728
PCT Pub. Date: Jun. 27, 2019

(65) Prior Publication Data
US 2020/0388024 A1    Dec. 10, 2020

(30) Foreign Application Priority Data

Dec. 21, 2017  (KR) .................. 10-2017-0176878

(51) Int. Cl.
*G06K 9/00* (2022.01)
*G06T 7/73* (2017.01)
(Continued)

(52) U.S. Cl.
CPC ............... *G06T 7/74* (2017.01); *G06F 18/00* (2023.01); *G06F 18/21* (2023.01); *G06F 18/28* (2023.01);
(Continued)

(58) Field of Classification Search
CPC .......... G06K 9/00201; G06K 9/00208; G06K 9/00664; G06K 9/20; G06K 9/2018;
(Continued)

(56) References Cited

U.S. PATENT DOCUMENTS 6,328,523 B1 * 12/2001 Watanabe .............. B25J 9/1687
345/625
9,002,098 B1 * 4/2015 Chelian ................ G06V 10/421
382/153

(Continued)

FOREIGN PATENT DOCUMENTS

JP    2012-218119    11/2012
JP    2015-168040     9/2015
(Continued)

OTHER PUBLICATIONS

Alex Kendall, et al., "PoseNet: A Convolutional Network for Real-Time 6-DOF Camera Relocalization", Computer Vision Foundation, arXiv.org, May 27, 2015, pp. 2938-2946, https://www.cv-foundation.org/openaccess/content_iccv_2015/papers/Kendall_PoseNet_A_Convolutional_ICCV_2015_paper.pdf.
(Continued)

*Primary Examiner* — Eric Rush
(74) *Attorney, Agent, or Firm* — Nixon & Vanderhye, P.C.

(57) ABSTRACT

According to various embodiments of the present invention, an electronic device comprises: a memory including instructions and a training database, which includes data, on at least one object, acquired on the basis of an artificial intelligence
(Continued)

algorithm; at least one sensor; and a processor connected to the at least one sensor and the memory, wherein the processor can be configured to execute the instructions in order to acquire data on a designated area including the at least one object by using the at least one sensor, identify location information and positioning information on the at least one object on the basis of the training database, and transmit a control signal for picking the at least one object to a picking tool related to the electronic device on the basis of the identified location information and positioning information.

13 Claims, 11 Drawing Sheets

(51) Int. Cl.

| | | |
|---|---|---|
| G06T 7/50 | (2017.01) | |
| G06T 7/70 | (2017.01) | |
| G06T 7/00 | (2017.01) | |
| G06T 1/00 | (2006.01) | |
| G06V 10/70 | (2022.01) | |
| G06V 10/774 | (2022.01) | |
| G06F 18/00 | (2023.01) | |
| G06F 18/21 | (2023.01) | |
| G06F 18/28 | (2023.01) | |
| G06V 10/143 | (2022.01) | |
| G06V 20/10 | (2022.01) | |

(52) U.S. Cl.
CPC .......... *G06T 1/0014* (2013.01); *G06T 7/0004* (2013.01); *G06T 7/50* (2017.01); *G06T 7/70* (2017.01); *G06V 10/143* (2022.01); *G06V 10/70* (2022.01); *G06V 10/774* (2022.01); *G06V 20/10* (2022.01); *G05B 2219/39001* (2013.01); *G05B 2219/40053* (2013.01); *G05B 2219/40543* (2013.01); *G05B 2219/40564* (2013.01); *G06T 2207/20081* (2013.01); *G06V 2201/06* (2022.01)

(58) Field of Classification Search
CPC ...... G06K 9/3233; G06K 9/3241; G06K 9/46; G06K 9/4609; G06K 9/48; G06K 9/62; G06K 9/6201; G06K 9/6202; G06K 9/6204; G06K 9/6206; G06K 9/6209; G06K 9/6217; G06K 9/6255; G06K 9/6256; G06K 2209/19; G06T 1/0014; G06T 7/0004; G06T 7/001; G06T 7/50; G06T 7/60; G06T 7/70; G06T 7/73; G06T 7/74; G06T 7/75; G06T 2207/20081; G06T 2207/20084; G06N 3/0454; G06N 3/0472; G06N 7/005; G06N 20/00; G06N 3/08; B25J 9/161; B25J 9/1697; B23P 19/04; B23P 19/06; B23P 19/08; B23P 19/082; B23P 19/10; B23P 19/105; B23P 19/12; G05B 2219/39; G05B 2219/39001; G05B 2219/39399; G05B 2219/39523; G05B 2219/39543; G05B 2219/40; G05B 2219/40053; G05B 2219/40087; G05B 2219/40107; G05B 2219/40543; G05B 2219/40563; G05B 2219/40564; G05B 2219/45063; G06V 10/00; G06V 10/10; G06V 10/143; G06V 10/22; G06V 10/25; G06V 10/255; G06V 10/26; G06V 10/40; G06V 10/422; G06V 10/44; G06V 10/70; G06V 10/751; G06V 10/757; G06V 10/77; G06V 10/774; G06V 20/10; G06V 20/64; G06V 20/647; G06V 20/653; G06V 2201/06; G06V 2201/07; G06V 2201/12

USPC ............... 382/100, 103, 141–145, 147, 149, 382/151–154, 157, 159, 160, 181, 199, 382/203, 209, 215–217, 224, 291; 348/86–91, 94, 95, 135, 142; 700/95, 700/114, 117, 159, 160, 186, 192, 193, 700/213, 245, 251, 254, 255, 259; 901/1–3, 8, 47

See application file for complete search history.

(56) References Cited

U.S. PATENT DOCUMENTS

| | | | |
|---|---|---|---|
| 10,055,667 B2 * | 8/2018 | Konolige | G06T 7/70 |
| 10,773,382 B2 * | 9/2020 | Bai | B25J 9/1697 |
| 10,861,184 B1 * | 12/2020 | Kalakrishnan | G06K 9/6212 |
| 11,273,553 B2 * | 3/2022 | Li | G06T 17/00 |
| 2006/0104788 A1 * | 5/2006 | Ban | G06T 7/75 |
| | | | 414/729 |
| 2010/0092032 A1 * | 4/2010 | Boca | B25J 9/1679 |
| | | | 382/103 |
| 2011/0273442 A1 | 11/2011 | Drost et al. | |
| 2012/0259462 A1 * | 10/2012 | Aoba | B25J 9/1697 |
| | | | 700/245 |
| 2015/0010202 A1 | 1/2015 | Tuzel et al. | |
| 2015/0124057 A1 * | 5/2015 | Yamazaki | G06V 10/42 |
| | | | 348/46 |
| 2015/0251314 A1 | 9/2015 | Nammoto et al. | |
| 2015/0261899 A1 * | 9/2015 | Atohira | G06F 30/20 |
| | | | 703/7 |
| 2015/0283704 A1 | 10/2015 | Watanabe | |
| 2016/0332299 A1 | 11/2016 | Suzuki | |
| 2017/0151672 A1 * | 6/2017 | Ando | G06T 7/75 |
| 2019/0122380 A1 * | 4/2019 | Cao | G06K 9/6202 |

FOREIGN PATENT DOCUMENTS

| | | |
|---|---|---|
| JP | 2015-199155 | 11/2015 |
| JP | 2017-030135 | 2/2017 |
| JP | 2017-86258 | 5/2017 |

OTHER PUBLICATIONS

Alex Kendall, et al., "PoseNet: A Convolutional Network for Real-Time 6-DOF Camera Relocalization", Computer Vision Foundation, arXiv.org, May 27, 2015, pp. 2938-2946, https://www.cyfoundaton.org/opensaccess/content_iccv_2015/papers/Kendall_PoseNet_A_Convolutional_ICCV_2015_paper.pdf.
International Search Report for PCT/KR2018/013345 dated Apr. 4, 2019, 5 pages.
Written Opinion of the ISA for PCT/KR2018/013345 dated Apr. 4, 2019, 5 pages.
Notice of Preliminary Rejection dated Nov. 24, 2022 in Korean Patent Application No. 10-2017-0176878 and English-language translation.

* cited by examiner

APPARATUS AND METHOD FOR IDENTIFYING AND PICKING OBJECT USING ARTIFICIAL INTELLIGENCE ALGORITHM

This application is the U.S. national phase of International Application No. PCT/KR2018/013345 filed Nov. 6, 2018 which designated the U.S. and claims priority to KR Patent Application No. 10-2017-0176878 filed Dec. 21, 2017, the entire contents of each of which are hereby incorporated by reference.

FIELD

Various embodiments relate to a method and electronic device for identifying a specified object on the basis of acquiring information on the specified object and training the acquired information.

DESCRIPTION OF RELATED ART

With the technology development of electronic devices, the electronic devices can perform various operations instead of users, thereby providing a convenience to the users. For example, instead of the user, the electronic device can pick an object in a factory and then transfer the picked object to a specific location. This operation can be called bin-picking. In a process of execution of the bin-picking operation, the electronic device can identify an object for picking. The electronic device can identify the object in a scheme of extracting a feature point of the object.

SUMMARY

The electronic device can identify the object on the basis of the scheme of extracting the feature point. The scheme of extracting the feature point of the electronic device has a problem of having to vary a scheme of feature extraction according to a thing, and being sensitive to a change of an external environment.

Various embodiments may provide an electronic device and method for identifying an object by using training data which is based on an artificial intelligence (AI) algorithm and/or simulation.

Technological solutions the present document seeks to achieve are not limited to the above-mentioned technological solutions, and other technological solutions not mentioned above would be able to be clearly understood by a person having ordinary skill in the art from the following statement.

An electronic device of various embodiments includes a memory including a training database, which includes data on at least one object acquired on the basis of an artificial intelligence algorithm, and instructions, at least one sensor, and a processor coupled with the at least one sensor and the memory. The processor is configured to execute the instructions in order to acquire data on a specified area including at least one object by using the at least one sensor, and identify location information and positioning information on the at least one object, on the basis of the training database, and transmit a control signal for picking the at least one object to a picking tool related to the electronic device, on the basis of the identified location information and positioning information.

A method of an electronic device of various embodiments includes acquiring data on a specified area including at least one object by using the at least one sensor, identifying location information and positioning information on the at least one object, on the basis of a training database which includes data on the at least one object acquired on the basis of an artificial intelligence algorithm, and transmitting a control signal for picking the at least one object to a picking tool related to the electronic device, on the basis of the identified location information and positioning information.

A non-transitory computer-readable storage medium of various embodiments stores one or more programs for executing acquiring data on a specified area including at least one object by using at least one sensor, identifying location information and positioning information on the at least one object, on the basis of a training database which includes data on the at least one object acquired on the basis of an artificial intelligence algorithm, and transmitting a control signal for picking the at least one object to a picking tool related to an electronic device, on the basis of the identified location information and positioning information.

An electronic device of various embodiments and an operation method thereof are generically usable for various things by using an artificial intelligence algorithm and training data.

An effect that may be obtained from the present disclosure is not limited to the effects mentioned above, and other effects not mentioned would be able to be apparently understood from the above statement by a person having ordinary skill in the art to which the present disclosure pertains.

DETAILED DESCRIPTION OF EXAMPLE EMBODIMENTS

Terms used in the present disclosure are ones used to just describe specific embodiments, and may not intend to limit the scope of other embodiments. The expression of a singular form may include the expression of a plural form unless otherwise dictating clearly in context. The terms used herein including the technological or scientific terms may have the same meanings as those generally understood by a person having ordinary skill in the art mentioned in the present disclosure. Among the terms used in the present disclosure, terms defined in a general dictionary may be interpreted as the same or similar meanings as the contextual meanings of a related technology, and are not interpreted as ideal or excessively formal meanings unless defined clearly in the present disclosure. According to cases, even the terms defined in the present disclosure may not be construed as excluding embodiments of the present disclosure.

In various embodiments of the present disclosure described below, a hardware access method is explained as an example. However, the various embodiments of the present disclosure include a technology using all of hardware and software, so the various embodiments of the present disclosure do not exclude a software-based access method.

Figure 1:
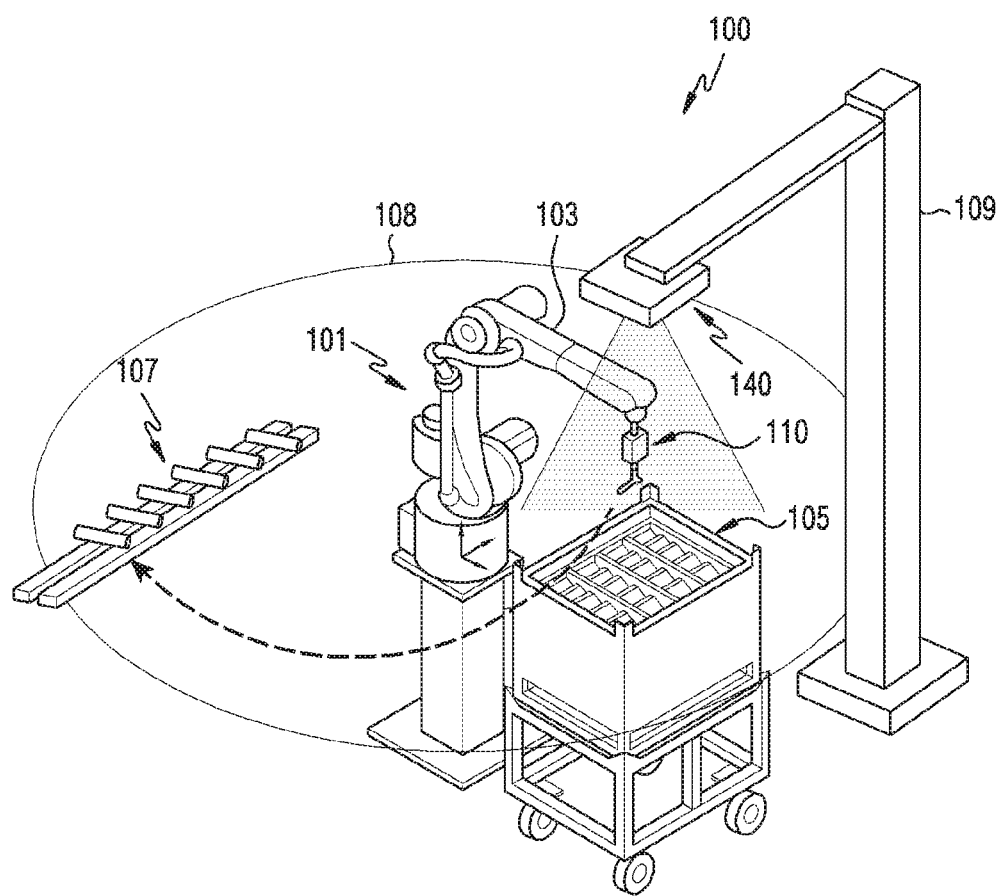
FIG. 1 illustrates an example of an environment including an electronic device according to various embodiments.

FIG. 1 illustrates an example of an environment including an electronic device according to various embodiments. In various embodiments, FIG. 1 may show a system (e.g., a bin-picking system) for picking an object (or a thing) by using the electronic device 101. The bin-picking system may denote a system gripping an object located in a specified area (e.g., a bin or box) 105 and transferring the same outside the specified area 105.

Referring to FIG. 1, the electronic device 101 may pick (grip) and transfer an object by using various components. In various embodiments, the electronic device 101 may identify the object located (or included) in the specified area 105 in order to pick the object. For example, the electronic device 101 may identify at least one of the existence or non-existence of the object in the specified area 105, location information of the object, or positioning information of the object by using a sensor 140. The electronic device 101 may pick the identified object by using a picking tool 110, and transfer the picked object to a specific location by controlling a movement of a rotation module (or robot arm) 103.

In various embodiments, the sensor 140 may include various sensors for acquiring information on an object. For example, the sensor 140 may include a camera (or an optical camera or an image sensor) capable of acquiring an image (or a video, or multimedia data). For another example, the sensor 140 may include a depth camera for acquiring distance information related to the object or depth information related to the object. For further example, the sensor 140 may include an ultrasonic camera (or an ultrasonic sensor) or an infrared camera (or an infrared sensor).

In various embodiments, the sensor 140 may include a single or plurality of sensors. For example, the sensor 140 may include at least one of an image sensor, an optical sensor, an illumination sensor, or a color sensor. The sensor 140 may include various types of sensors for acquiring information on the specified area 105, and is not limited to the aforementioned example.

In various embodiments, the sensor 140 may be located in various locations capable of acquiring information on the specified area 105. According to an embodiment, the sensor 140 may be located in the electronic device 101, or a frame 109 located near the specified area 105. The frame 109 may be located in a fixed state on the ground, and the sensor 140 may be located in an upper portion of the frame. For example, the sensor 140 may be located in an end portion (or terminal portion) of the frame 109 protruded toward a top of the specified area 105. The sensor 140 may be located in a direction of looking down the specified area 105 from the end portion of the frame 109. On the basis of being located in the direction of looking down the specified area 105, the sensor 140 may obtain or acquire information on the specified area 105 or an object included in the specified area 105. For example, the sensor 140 may acquire information on an image (or a video) showing the specified area 105, at a location related to the specified area 105. The information on the image showing the specified area 105 may include image (or video) information of at least one object included in the specified area 105.

In various embodiments, the electronic device 101 may be coupled with the sensor 140 by using a network (e.g., wired communication or wireless communication). The electronic device 101 may identify information acquired through the sensor 140 on the basis of the coupling. On the basis of acquiring the information on the specified area through the sensor 140, the electronic device 101 may identify at least one of the number of at least one object included in the specified area 105, a location of each of the at least one object, a form of the at least one object, and/or a position of the at least one object. An operation related to the identifying will be described later.

Though not illustrated, in various embodiments, the electronic device 101 may include the sensor 140. In this case, the sensor 140 may be located adjacently to the specified area 105 in order to acquire information on the specified area 105. For example, the sensor 140 may be located in an end portion of the rotation module 103 of the electronic device 101, which may be located at a top of the specified area 105. The end portion of the rotation module 103 may be a portion to which the grip tool 110 is coupled movably. The sensor 104 may be located in the end portion of the rotation module 103, and acquire the information on the specified area 105. For example, the sensor 104 may be located in the end portion of the rotation module 103 located at the top of the specified area 105, and acquire an image of the specified area 105.

In various embodiments, the rotation module 103 may denote a part of the electronic device 101 for movement of the picking tool 110. For example, the rotation module 103 may be called a robot arm. The rotation module 103 may include movable various forms, and is not limited to the illustrated example.

In various embodiments, the electronic device 101 may pick an object by using the picking tool 110 for picking the object. In some embodiments, the electronic device 101 may pick the object by controlling the picking tool 110 on the basis of information acquired through the sensor 140. For example, the electronic device 101 may identify a location or position of the object on the basis of the information acquired through the sensor. On the basis of the identifying, the electronic device 101 may pick the object by enabling the picking tool 110 to connect to the specified area 105 where the object is located. In other some embodiments, the electronic device 101 may provide a control signal for picking the object on the basis of identifying the object. The electronic device 101 may transmit the control signal for the picking of the object, to the picking tool 110. By transmitting the control signal, the electronic device 101 may cause the picking of the object.

In various embodiments, the electronic device 101 may include the rotation module 103 for moving a picked object. The electronic device 101 may move the picked object to a specific location on the basis of controlling a movement of the rotation module 103. The specific location may denote a final destination related to the movement of the object. For example, the electronic device 101 may pick the object and transfer the same onto a conveyor belt 107. For another example, the electronic device 101 may pick the object in a first box and transfer the same to a second box. Here, the first box may correspond to the specified area 105, and the second box may correspond to the conveyor belt 107. An origination (e.g., the specified area 105 or the first box) and a destination (e.g., the conveyor belt 107 or the second box) for moving the object may be previously specified by a user of the electronic device 101, and are not limited to the aforementioned example.

In various embodiments, the electronic device 101 may control a rotation of the rotation module 103 in a fixed location, and move an object. By rotating the rotation module 103 in one direction (or in the direction of the conveyor belt 107) with a criterion of a center axis of the electronic device 101, the electronic device 101 may transfer the object onto the conveyor belt 107. For example, by rotating the rotation module 103 of the electronic device 101 in the left direction, the electronic device 101 may transfer the object onto the conveyor belt 107.

In various embodiments, the rotation module 103 may be a form protruded from the center axis (or fixed axis) of the electronic device 101. Part of the rotation module 103 may be coupled (or included) onto the center axis of the electronic device 101, and another part (or terminal portion) of the rotation module 103 may be coupled with the picking tool 110 (or include the picking tool 110). The rotation module 103 may move an object within a working range 108. For example, the working range 108 may include a circular range having a length of the rotation module 103 as a radius. A length of the rotation module 103 may indicate a length from the center axis of the electronic device 101 to the terminal portion of the rotation module 103 which the picking tool 110 is coupled with. In accordance with embodiments, the electronic device 101 may adjust the length of the rotation module 103. On the basis of the adjustment, the working range of the electronic device 101 may be changed according to the length of the rotation module 103. In various embodiments, the rotation module 103 may be a functional construction for explaining a movement of the electronic device 101 for moving the object, and is not limited to the aforementioned example.

The environment 100 including the electronic device 101 of various embodiments may include a logistics warehouse or logistics plant where a movement of an object is repeatedly required. In the environment 100, the electronic device 101 may, instead of human, pick the object, and move the object to a specific location. On the basis of the use of the electronic device 101, the building of a logistics automation system may be possible.

Figure 2:
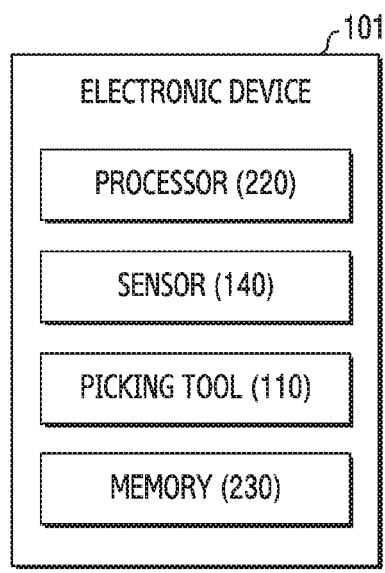
FIG. 2 is a block diagram of an electronic device according to various embodiments.

FIG. 2 is a block diagram of an electronic device according to various embodiments. Referring to FIG. 2, the electronic device 101 may include a processor 220, the sensor 140, the picking tool 110 or a memory 230. In accordance with embodiments, at least one (e.g., the sensor 140) of the components within the electronic device 101 may be omitted, or another component may be added. For example, the sensor 140 may be located outside the electronic device 101.

The processor 220 may execute, for example, software and control at least one another component (e.g., a hardware or software component) of the electronic device 101 coupled with the processor 220, and may perform various data processing or computation. The processor 220 may load and process a command or data received from another component (e.g., the sensor 140) on a part (e.g., a volatile memory) of the memory 230, and may store the result data in another part (e.g., a nonvolatile memory) of the memory 230. In some embodiment, the processor 220 may include a main processor (e.g., a central processing unit or an application processor), and an auxiliary processor (e.g., a graphics processing unit, an image signal processor, a sensor hub processor, or a communication processor) that is operable independently from, and additionally or alternatively, uses lower power than the main processor, or is specialized for a specified function. Here, the auxiliary processor may be separate from or be embedded in the main processor and be operated.

The auxiliary processor may, for example, control at least some of functions or states related to at least one component (e.g., the sensor 140) among the components of the electronic device 101, instead of the main processor while the main processor is in an inactive (e.g., sleep) state, or together with the main processor while the main processor is in an active (e.g., application execution) state. According to an embodiment, the auxiliary processor (e.g., a communication processor) may be implemented as part of operatively related another component (e.g., the sensor 140).

The processor 220 may provide training data for identifying an object. The processor 220 may provide the training data on the basis of an artificial intelligence algorithm (e.g., a first artificial intelligence algorithm). The processor 220 may provide the training data by processing at least one of virtual data or real data on at least one object on the basis of the artificial intelligence algorithm. The artificial intelligence algorithm may include at least one of, for example, a machine learning algorithm, a neural network algorithm, a deep learning algorithm, or a rule based model. The processor 220 may store the provided training data in a training database (or a learning database, or a training DB, or a learning DB). By presenting the provided training data to the memory 230, the processor 220 may store the training data in the training database.

In various embodiments, the processor 220 may present virtual data or real data on at least one object to an external device (e.g., a server) related to the artificial intelligence algorithm. The training data may be provided by the server. The processor 220 may receive the training data provided by the server, from the server.

In various embodiments, virtual data on at least one object may include data related to a form, size, or shape of the object. For example, the virtual data may include, in a two-dimensional (2D) image, three-dimensional (3D) data (or rendering data) provided on the basis of at least one of a light source, a location, a color, a form, and a shape. A detailed description related to the virtual data will be made through FIG. 8 or FIG. 9. For another example, the virtual data may include detailed data for representing one object. The real data related to the object may include real information on the object acquired by sensing the object through various sensors. For example, the real data may include data (e.g., video data and/or image data) on the object, which is acquired (or recognized) through the sensor 140 included in the electronic device 101. For another example, the real data may be received from the external device (or another device), and include data (e.g., video data and/or image data) on the object acquired by the external device.

The processor 220 may process virtual data on the basis of a physical simulator (or a physical engine). The physical simulator may be a component of the electronic device 101 for simulating a physical system. The physical system may include a system related to, for example, rigid dynamics, fluid dynamics, dynamics, or statistics. The processor 220 may simulate (below, physical-simulate) the virtual data on the basis of the physical simulator. The processor 220 may process the virtual data by using various physical numeric values on the basis of the physical simulator. The processor 220 may acquire sensor data on the object on the basis of physical simulation. A detailed description related to the sensor data will be made later through FIG. 8 or FIG. 9.

The processor 220 may process data related to an object on the basis of a video simulator (or a video engine, or a video based simulator). The processor 220 may process sensor data acquired through the physical simulator, on the basis of the video simulator. The processor 220 may video-simulate the sensor data on the basis of the video simulator. The video simulator may be related to the artificial intelligence algorithm (e.g., the first artificial intelligence algorithm), and the processor 220 may perform video simulation on the basis of the artificial intelligence algorithm.

In various embodiments, the first artificial intelligence algorithm may include a Gaussian mixture model (GMM), an auto encoder (AE), or a generative adversarial network (GAN). In response to the first artificial intelligence algorithm including the GAN, the processor 220 may include a provision module for providing virtual data related to an object and a distinction module for distinguishing (or dividing or identifying) the virtual data from real data related to the object. The provision module may train not to distinguish the virtual data from the real data in providing the virtual data, that is, train to provide the virtual data in the most similar form. The distinction module may train to distinguish a difference between the virtual data provided through the provision module and the inputted real data. On the basis of the training through the provision module and the distinction module, the processor 220 may provide training data on the first artificial intelligence algorithm. In accordance with embodiments, the processor 220 may perform training which is based on the first artificial intelligence algorithm by using previously stored data related to the real data or the virtual data. The processor 220 may provide the training data on the basis of the training. A detailed description related to the training data will be made later through FIG. 8 or FIG. 9.

In various embodiments, the physical simulator or the video simulator may be constructed with hardware, software or firmware. The physical simulator or the video simulator may interchangeably be used with terms, for example, logic, logic block, part, circuitry or the like. The physical simulator or the video simulator may be an integral part or the minimum unit performing one or more functions or a portion thereof.

In other some embodiments, the training database may include data which is updated continuously on the basis of the artificial intelligence algorithm. By identifying information acquired through the sensor 140 or a user input, the processor 220 may update training data on the basis of the first artificial intelligence algorithm. In response to the updating of the training data, the processor 220 may update the training database.

By using the sensor 140, the processor 220 may acquire information on the specified area 105. The specified area 105 may include at least one object. The acquired information may include image information or video information on the specified area 105. The processor 220 may identify the acquired information on the basis of the training database (or the learning database). The training database may include the training data which is provided on the basis of the first artificial intelligence algorithm.

In various embodiments, the processor 220 may identify information acquired through the sensor 140 on the basis of the first artificial intelligence algorithm. By using the training (or learning) data related to the first artificial intelligence algorithm, the processor 220 may identify information acquired through the sensor 140 on the basis of a second artificial intelligence algorithm.

In various embodiments, the second artificial intelligence algorithm may include a neural network. The second artificial intelligence algorithm may include, for example, a fully convolutional network not including a fully connected layer. In this case, on the basis of the second artificial intelligence algorithm, the processor 220 may acquire a video (e.g., a black and white video or a color video) of a resolution corresponding to a resolution of an input video. On the basis of the second artificial intelligence algorithm, the processor 220 may process an input value at a high speed or in parallel. The processor 220 may use a video having a variable size for training which is based on the second artificial intelligence algorithm.

In some embodiments, the first artificial intelligence algorithm related to acquiring of training data and the second artificial intelligence algorithm related to identifying of information acquired through the sensor may differ (or be different or distinct). In other some embodiments, the first artificial intelligence algorithm related to the acquiring of the training data may correspond to (or be the same or match with) the second artificial intelligence algorithm related to the identifying of the information acquired through the sensor.

By identifying the acquired information, the processor 220 may identify at least one object. For example, by identifying the acquired information, the processor 220 may acquire information on at least one of six degrees of freedom (e.g., an x-axis coordinate value, a y-axis coordinate value, a z-axis coordinate value, a yaw, a roll, and/or a pitch) of the at least one object. For another example, by identifying the acquired information, the processor 220 may acquire values of Euler angles for representing a direction of the object in a three-dimensional space. For further example, by identifying the acquired information, the processor 220 may acquire a value of quaternion for representing a rotation of the object. For yet another example, by identifying the acquired information, the processor 220 may acquire location information of at least one object and/or positioning information of the at least one object.

In some embodiments, the location information of the at least one object may include information on the existence or non-existence of at least one object in the specified area 105 and/or information representing a location of the at least one object in the specified area 105. For example, the location information of the at least one object may include coordinate value information of at least one of an x axis, y axis, or z axis of the specified area 105.

In other some embodiments, the positioning (e.g., three degrees of freedom) information of the at least one object may include a form in which the at least one object is located within the specified area 105. For example, the positioning information may include information on a rotation, angle, or slope of the at least one object. For another example, the positioning information may include information on at least one of a yaw, roll, or pitch of the at least one object. In embodiments, in response to a movement direction of the picking tool 110 being an x-axis direction, a rotation axis of the yaw may be a z axis (or an axis of a gravity direction), and a rotation axis of the pitch may be a y axis, and a rotation axis of the roll may be an x axis.

In various embodiments, the processor 220 may perform an operation for picking of an object on the basis of identifying the object. For example, the processor 220 may provide a control signal for picking the object. The processor 220 may transmit the provided control signal to the picking tool 110. On the basis of the transmission, a movement of the picking tool 110 may be caused, and at least one object located in the specified area 105 may be picked by the picking tool 110.

The sensor 140 may include various sensors for acquiring information on an object. For example, the sensor 140 may include a camera sensor (or an image sensor) capable of acquiring an image. For another example, the sensor 140 may include a depth camera for acquiring distance information or depth information related to the object or 3-dimensional information. To acquire the information on the object, the sensor 140 may be located in a portion of the electronic device. For example, the sensor 140 may be located at a top of the picking tool. For another example, the sensor 140 may be located in a portion of the rotation module 103. Though not illustrated, the sensor 140 may be a construction separate from the electronic device 101. For example, the sensor 140 may be included in the external device. The sensor 140 may be located in various locations for acquiring the information on the object, and is not limited to the aforementioned example.

In various embodiments, in response to the sensor 140 being located outside the electronic device 101, the processor 220 may be wirelessly or wiredly coupled with the sensor 140. Though not illustrated, the processor 220 may include a communication interface, and the processor 220 may receive information from the sensor 140 through the communication interface. On the basis of the information (e.g., image information or video information) received from the sensor 140, the processor 220 may identify the specified area 105 including at least one object.

The communication interface of various embodiments may support a specified protocol capable of wiredly or wirelessly coupling with the external device (e.g., another device 103). According to an embodiment, the communication interface may include a high definition multimedia interface (HDMI), a universal serial bus (USB) interface, a secure digital (SD) card interface, or an audio interface. The communication interface may include a coupling terminal (or connector) capable of physically coupling the electronic device 101 and an external electronic device (e.g., the sensor 140). The coupling terminal may include, for example, a HDMI connector, a USB connector, a SD card connector, or an audio connector (e.g., a headphone connector).

The communication interface may support the establishment of a wired or wireless communication channel between the electronic device 101 and the external device (e.g., the server), and communication execution through the established communication channel. The communication interface may include one or more communication processors that are operated independently of the processor 220 (e.g., an application processor) and support a wired communication or a wireless communication. According to an embodiment, the communication interface may include a wireless communication module (e.g., a cellular communication module, a short-range wireless communication module, or a global navigation satellite system (GNSS) communication module) or a wired communication module (e.g., a local area network (LAN) communication module or a power line communication module). By using a corresponding communication module among them, the communication interface may communicate with the external electronic device via a first network (e.g., a short-range communication network such as Bluetooth, WiFi direct or infrared data association (IrDA)) or a second network (e.g., a long-range communication network such as a cellular network, the internet, or a computer network (e.g., a LAN or a WAN)). The aforementioned several kinds of communication interfaces may be implemented as a single chip or may be each implemented as a separate chip. According to an embodiment, the wireless communication module may distinguish and authenticate the electronic device 101 within a communication network by using user information stored in a subscriber identification module.

The communication interface may include an antenna module. The antenna module may include one or more antennas for transmitting a signal or power to the external or receiving a signal or power from the external. According to an embodiment, the communication interface (e.g., wireless communication module) may transmit a signal to the external electronic device via an antenna suitable for a communication scheme, or receive a signal from the external electronic device.

Some components among the above-described components of the electronic device 101 may be mutually coupled through a communication scheme (e.g., a bus, a general purpose input/output (GPIO), a serial peripheral interface (SPI), or a mobile industry processor interface (MIPI)) between peripheral devices, and exchange a signal (e.g., a command or data) between each other. According to an embodiment, the command or data may be transmitted or received between the electronic device 101 and another device through the server coupled to the second network. The another device may be a device of a kind that is the same as or different from that of the electronic device 101. According to an embodiment, all or some of operations executed in the electronic device 101 may executed in another or a plurality of external electronic devices. According to an embodiment, in response to the electronic device 101 having to perform some function or service automatically or by a request, the electronic device 101 may, instead of or additionally to executing the function or service in itself, send a request for at least some functions associated with this to the external electronic device. The external electronic device receiving the request may execute the requested function or additional function, and forward the result to the electronic device 101. The electronic device 101 may process the received result as it is or additionally, and present the requested function or service. To that end, a cloud computing, distributed computing, or client-server computing technology may be used, for example.

The memory 230 may store various data used by at least one component (e.g., the processor 220) of the electronic device 101, for example, software, and input data or output data on a command related to this. For another example, the memory 230 may store training data (or training database) provided by the processor 220. The memory 230 may include a volatile memory and/or a nonvolatile memory.

In various embodiments, the memory 230 may include a training database related to an object. The training database may include at least one of real data on the object acquired by the sensor, real data on the object acquired from another electronic device, virtual data on the object, 3D modeling data on the object, physical simulation data on the object, video simulation data on the object, video (e.g., white and black video or color video) data on the object, location information of the object, or positioning information of the object.

The picking tool 110 may include at least one of a gripper for gripping an object, a pneumatic sucker, an electromagnet, an actuator, a floating joint, or a shock-absorbing device. In various embodiments, the picking tool 110 may be located attachable to an end of the rotation module 103 of FIG. 1. The picking tool 110 may be moved to the left or right by a movement of the rotation module 103. The picking tool 110 may be moved up or down with a criterion of a portion coupled with the rotation module 103. In accordance with embodiments, a circular groove may exist in a lower end of the electromagnet included in the picking tool 110. By using the electromagnet, the picking tool 110 may grip the object on the basis of a flow of electric current.

In various embodiments, the picking tool 110 may receive a control signal from the processor 220. The control signal may include a signal provided by the processor 220. The control signal may include a signal for picking of an object. The signal for picking of the object may include, for example, a signal for representing location information of the object or positioning information of the object in the specified area 105. On the basis of the control signal, the picking tool 110 may perform a movement for picking the object.

In various embodiments, the electronic device 101 may acquire data on an object by using a sensor of a relatively low price compared to a high-performance three-dimensional sensor. The high-performance three-dimensional sensor may include, for example, a structured light 3D sensor, a 3D laser scanning sensor, or a time-of-flight depth camera. The low-priced sensor may include, for example, an image sensor, a Kinect sensor, an ultrasonic sensor, or an infrared sensor. The low-priced sensor may include, for another example, a shape recognition sensor capable of identifying the existence or non-existence of a thing or a shape thereof, or a 2-dimensional sensor (or a 2-dimensional optic sensor or a video sensor) measuring a location of the thing. In accordance with embodiments, the electronic device 101 may reduce a construction cost of a bin-picking system by using the low-priced sensor instead of the high-performance three-dimensional sensor.

In various embodiments, by applying the artificial intelligence algorithm to data acquired through the low-priced sensor, the electronic device 101 may provide (or acquire) an artificial intelligence learning model. By using the artificial intelligence learning model, the electronic device 101 may recognize an object and estimate a position of the object. The electronic device 101 may process various exceptional situations which occur in a process for picking of the object.

An electronic device 101 of various embodiments may include a memory 230 including a training database, which includes data on at least one object acquired on the basis of an artificial intelligence algorithm, and instructions, at least one sensor 140, and a processor 220 coupled with the at least one sensor 140 and the memory 230. The processor 220 may be configured to execute the instructions in order to acquire data on a specified area including at least one object by using the at least one sensor 140, and identify location information and positioning information on the at least one object, on the basis of the training database, and transmit a control signal for picking the at least one object to a picking tool 110 related to the electronic device 101, on the basis of the identified location information and positioning information.

In various embodiments, the at least one sensor 140 may include a sensor for measuring at least one of whether the at least one object is included in the specified area, a shape of the at least one object, a location of the at least one object, and a position of the at least one object.

In various embodiments, the data on the specified area may include information representing an image related to the specified area.

In various embodiments, the location information of the at least one object may include at least one of an x-axis value, a y-axis value, or a z-axis value on the specified area of the at least one object, and the positioning information of the at least one object may include at least one of information on a yaw of the at least one object, information on a roll, or information on a pitch.

In various embodiments, the location information of the at least one object may include an x-axis value and a y-axis value on the specified area of the at least one object. The positioning information of the at least one object may include information on a yaw of the at least one object.

In various embodiments, the processor 220 may be further configured to execute the instructions in order to provide a location map representing the location information, on the basis of the identified location information of the at least one object, and provide a position map representing the positioning information, on the basis of the identified positioning information of the at least one object. In some embodiments, the processor 220 may be configured to provide the location map and the position map, on the basis of the artificial intelligence algorithm. In other some embodiments, the processor 220 may be further configured to execute the instructions in order to transmit a control signal for picking the at least one object to the picking tool 110 related to the electronic device 101, on the basis of the provided location map and the provided position map.

In various embodiments, the processor 220 may be further configured to execute the instructions in order to process the data on the specified area, the location information of the at least one object, and the positioning information, on the basis of the artificial intelligence algorithm, and update the training database on the basis of the processing.

In various embodiments, the training database may include the location information of the at least one object, the positioning information of the at least one object, and video information of the at least one object, and the video information may include virtual data representing the at least one object, and information provided on the basis of the artificial intelligence algorithm.

The electronic device 101 of various embodiments disclosed in the present document may be devices of various forms. The electronic device 101 may include at least one of, for example, a portable communication device (e.g., a smart phone), a computer device, a portable multimedia device, a portable medical device, a camera, a wearable device, or a home appliance. The electronic device 101 of an embodiment of the present document is not limited to the aforementioned devices.

Various embodiments of the present document and the terms used herein are not to limit the technology mentioned in the present document to a specific embodiment form, and should be construed as including various changes, equivalents, and/or alternatives of the corresponding embodiment. In relation to a description of the drawing, like reference symbols may be used for like components. The expression of a singular form may include the expression of a plural form unless otherwise dictating clearly in context. In the present document, the expressions "A or B", "at least one of A and/or B", "A, B or C", "at least one of A, B and/or C" or the like may include all available combinations of items enumerated together. The expressions "a first", "a second", "the first", "the second" or the like may use corresponding components irrespective of order or importance, and are nothing but used to distinguish a component from another component and do not limit the corresponding components. When it is mentioned that any (e.g., a first) component is "(operatively or communicatively) coupled with/to" or is "connected to" another (e.g., a second) component, the any component may be directly coupled to the another component, or be coupled via a further component (e.g., a third component).

The term "module" used in the present document may include a unit consisting of hardware, software or firmware, and may be used interchangeably with the term, for example, "logic", "logic block", "component", "circuitry" or the like. The module may be an integral part or the minimum unit performing one or more functions or a portion thereof. For example, the module may consist of an application-specific integrated circuit (ASIC).

Various embodiments of the present document may be implemented by software (e.g., program) that includes an instruction stored in a machine (e.g., computer) —readable storage media (e.g., an internal memory or external memory). A machine is a device loading the stored instruction from the storage media and operable according to the loaded instruction, and may include an electronic device (e.g., the electronic device 101) of the disclosed embodiments. In response to the command being executed by a processor (e.g., the processor 220), the processor may perform a function corresponding to the command by itself or by using other components under the control of the processor. The command may include a code that is provided or executed by a compiler or interpreter. The machine-readable storage media may be presented in the form of a non-transitory storage media. Herein, the 'non-transitory' just means that the storage media do not include a signal and are tangible, and does not distinguish that data is stored in the storage media semi-permanently or temporarily.

According to an embodiment, a method of various embodiments disclosed in the present document may be included in a computer program product and be presented. The computer program product may be traded as a product between a seller and a buyer. The computer program product may be distributed on-line in the form of a machine-readable storage media (e.g., a compact disc read only memory (CD-ROM)) or through an application store (e.g., PlayStore™). In online distribution, at least a part of the computer program product may be at least transitorily stored or be temporarily provided in a storage media such as a memory of a manufacturer's server, an application store's server or a relay server.

Components (e.g., modules or programs) of various embodiments may each consist of a single or plurality of entities, and some sub components among the aforementioned corresponding sub components may be omitted, or other sub components may be further included in various embodiments. Alternatively or additionally, some components (e.g., modules or programs) may be integrated into one entity, and identically or similarly perform a function carried out by each corresponding component before integration. Operations carried out by a module, a program or another component of various embodiments may be executed in a sequential, parallel, repeated or heuristic manner, or at least some operations may be executed in different order or be omitted, or another operation may be added.

Figure 3:
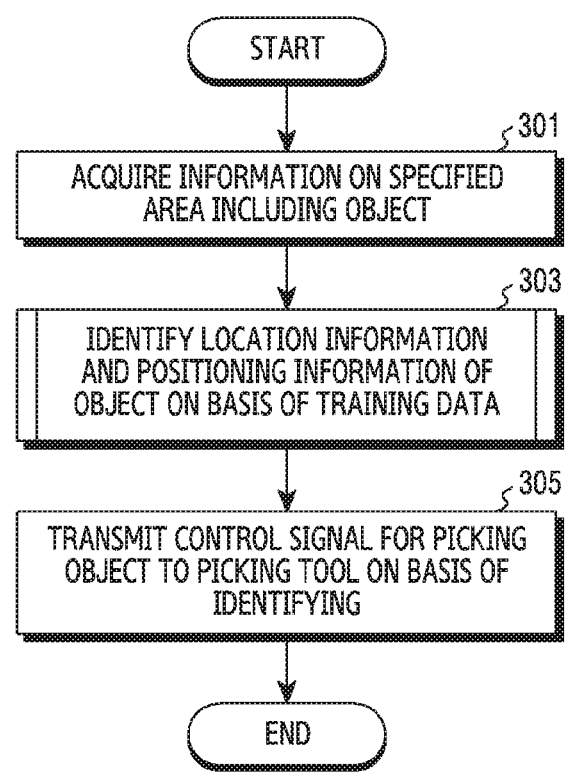
FIG. 3 illustrates an example of an operation of an electronic device according to various embodiments.

FIG. 3 illustrates an example of an operation of an electronic device according to various embodiments.

Referring to FIG. 3, in operation 301, the processor 220 may acquire information on the specified area 105 including an object (or at least one object). The processor 220 may acquire the information on the specified area 105 including the object through the sensor. The processor 220 may acquire image information on the specified area 105 acquired in real time through the sensor. The object may correspond to a target which the processor 220 intends to pick, and may include one or more objects. The specified area 105 denotes a specific area including the object, and may correspond to a specific location that is previously set by a user. For example, the specified area 105 may include a predetermined area within a box which is located around the electronic device 101. A description of the specified area 105 will be made later through a description of FIG. 4.

Figure 4:
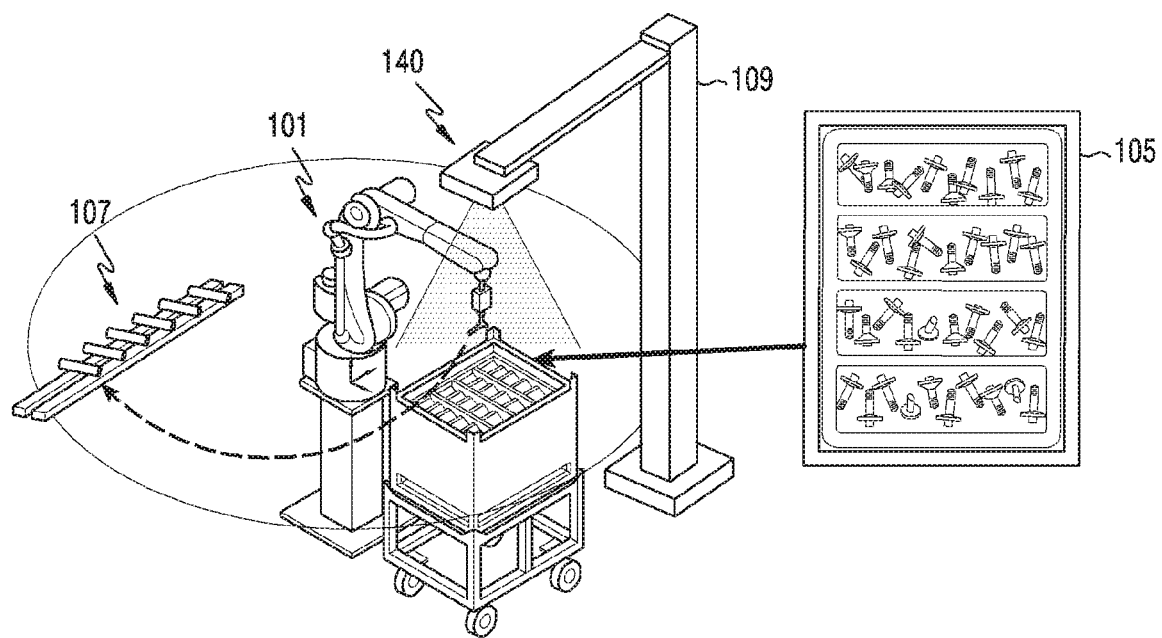
FIG. 4 illustrates an example of an electronic device identifying a specified area according to various embodiments.

Referring to FIG. 4, the electronic device 101 may acquire information on the specified area 105 that is in an adjacent location. The specified area 105 may include a portion of a specific section (or place) including an object. In the specified area 105, the object may be located randomly (or unintentionally).

The processor 220 may acquire information on the specified area through the sensor 140 which is located above the specified area 105. The sensor 140 may be located in a state of being spaced a distance apart upward from the specified area 105. In various embodiments, the sensor 140 may be located in a state of being attached to the fixed frame 109 on the ground. Although not illustrated, in accordance with embodiments, the sensor 140 may be located above the specified area 105, as a part of the electronic device 101. For example, the sensor 140 may be located as being attached to (or included in) a part (e.g., the rotation module 103) of the electronic device 101 protruded above the specified area 105.

In various embodiments, the sensor 140 may include a camera sensor or an image sensor. The information on the specified area may include, for example, image information (or video information) showing the specified area 105.

In operation 303, the processor 220 may identify location information and positioning information of the object on the basis of training data. The training data may include data which is previously provided on the basis of an artificial intelligence algorithm. The training data may include, for example, data which is learned on the basis of virtual data representing a shape of the object. For another example, the training data may include label information (or labeling information, or table information) of the object, which is provided on the basis of a user input in order to identify a location of the object, the existence or non-existence of the object, or a position of the object. A description related to the training data will be made later through FIG. 8 to FIG. 11.

In various embodiments, the training data may be provided by an external electronic device, and be received from the external electronic device. In this case, on the basis of the received training data, the processor 220 may identify the location information of the object and the positioning information of the object.

In various embodiments, the location information of the object may include information for representing a location of the object within the specified area 105. When assuming the specified area 105 on an xy plane, the location information of the object may include information on a coordinate value of an x axis and a coordinate value of a y axis. For example, in response to the object being located at the center of the specified area 105 of a square form having a length of 50 cm, the location information of the object may be (25, 25).

In various embodiments, the positioning information of the object may include information on at least one of a direction in which the object is located in the specified area 105, an angle, or a slope. For example, the positioning information of the object may include a value for representing information on at least one of a yaw, a roll, or a pitch. For another example, the positioning information of the object may include information that the specified area 105 is an xy plane and an angle is inclined with respect to a y axis on the xy plane.

In operation 305, on the basis of identifying the object, the processor 220 may transmit a control signal for picking the object to the picking tool 110. In various embodiments, the electronic device 101 may include the picking tool 110 as a part of the electronic device 101. In some embodiments, the processor 220 may control the picking tool 110 in order to pick the object. In accordance with embodiments, the processor 220 may provide the control signal for picking the object and transmit to the picking tool 110. On the basis of the transmission, the processor 220 may control a movement of the picking tool 110. By moving the picking tool 110, the processor 220 may pick (or grip) the object. In other some embodiments, the processor 220 may control the picking tool 110 through an auxiliary processor for control of the picking tool 110. The processor 220 may provide the control signal for picking the object and transmit to the auxiliary processor. On the basis of the transmission, the processor 220 may control a movement of the picking tool 110 on the basis of the auxiliary processor. By moving the picking tool 110 on the basis of the auxiliary processor, the processor 220 may pick (or grip) the object.

In various embodiments, the picking tool 110 may be located outside the electronic device 101. In this case, the electronic device 101 may be wirelessly or wiredly coupled with the picking tool 110. By transmitting a control signal to the picking tool 110, the processor 220 may control the picking tool 110 to pick the object. In accordance with embodiments, the processor 220 may provide the control signal for picking the object. By transmitting the provided control signal to the picking tool 110, the processor 220 may control the picking tool 110.

In various embodiments, the processor 220 may provide a control signal for representing (or controlling) a movement of the picking tool 110. For example, the control signal may include a signal for moving the picking tool 110 to a location corresponding to a location of an object. For another example, the control signal may include a signal for adjusting a location or direction of the picking tool 110 in a direction corresponding to a position of the object, in order to pick the object. By transmitting the control signal to the picking tool 110, the processor 220 may control the movement of the picking tool 110. On the basis of receiving the control signal, the picking tool 110 may pick the object included in the specified area 105. An operation of the picking tool 110 for picking the object may refer to FIG. 5.

Figure 5:
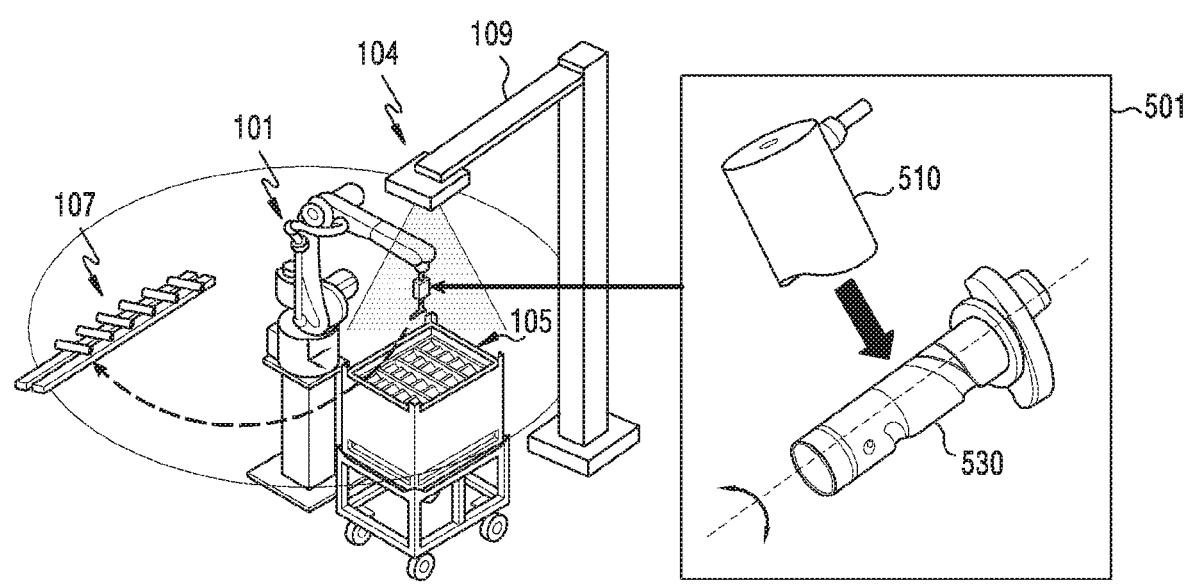
FIG. 5 illustrates an example of an electronic device picking an object according to various embodiments.

Referring to FIG. 5, a scene 501 magnifies and illustrates an operation of the picking tool 110 picking an object 530. The picking tool 110 may perform an operation of picking the object 530 on the basis of a control signal received from the processor 220. The picking tool 110 may include a contact part 510 getting in contact with the object. A bottom part of the contact part 510 may include a groove for picking of the object. The groove of the bottom part of the contact part 510 may have a form corresponding to a shape of the object. In accordance with embodiments, the contact part 510 may consist of an electromagnet, and may pick the object on the basis of an electrical signal. The picking tool 110 may pick the object by allowing the contact part 510 to approach the object 530 on the basis of the control signal. Though not illustrated, on the basis of the control signal, the picking tool 110 may transfer the picked object onto a conveyor belt. The contact part 510 of the picking tool 110 or the object 530 shown in FIG. 5 is an example for explaining the present disclosure, and the present disclosure is not limited by the aforementioned example.

In various embodiments, the electronic device 101 may be used in a logistics plant, a manufacturing plant, etc. where a movement of an object is repeatedly required, to build a plant automation system. By using a low-priced sensor, a cost required for a logistics automation system may be decreased.

Figure 6:
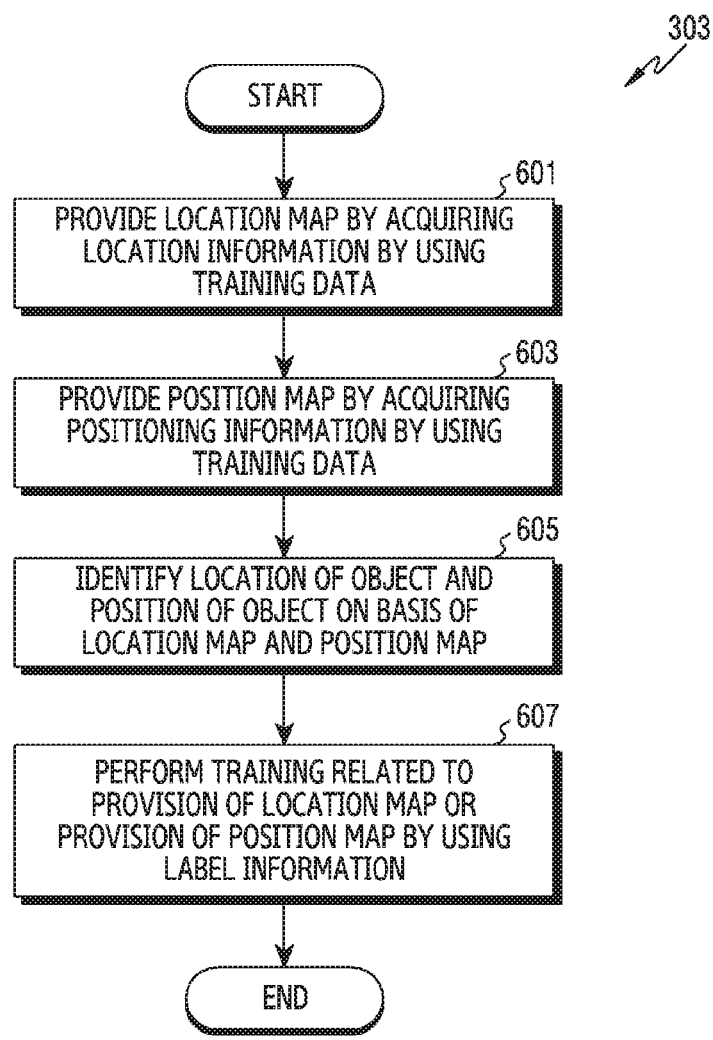
FIG. 6 illustrates another example of an operation of an electronic device related to training (or learning) according to various embodiments.

FIG. 6 illustrates another example of an operation of an electronic device related to training according to various embodiments. Operation 601 to operation 607 of FIG. 6 may be related to operation 405 of FIG. 4. Operations exemplified in FIG. 6 may not be essential elements for embodying operation 405 of FIG. 4. In other words, it should be noted that operation 601 to operation 605 of FIG. 6 is one embodiment and thus, may be omitted according to embodiments as well.

Referring to FIG. 6, in operation 601, the processor 220 may provide a location map by acquiring location information by using training data. By processing information on the specified area 105 acquired through the sensor on the basis of the training data, the processor 220 may provide the location map. The location map may include location information of an object included in the specified area 105.

In various embodiments, the processor 220 may acquire the location information of the object on the basis of previously stored training data. In accordance with embodiments, the processor 220 may update the training data in real time, and may acquire the location information of the object on the basis of the updated training data. The processor 220 may provide the location map on the basis of the location information. A description of the location map may refer to FIG. 7.

Figure 7:
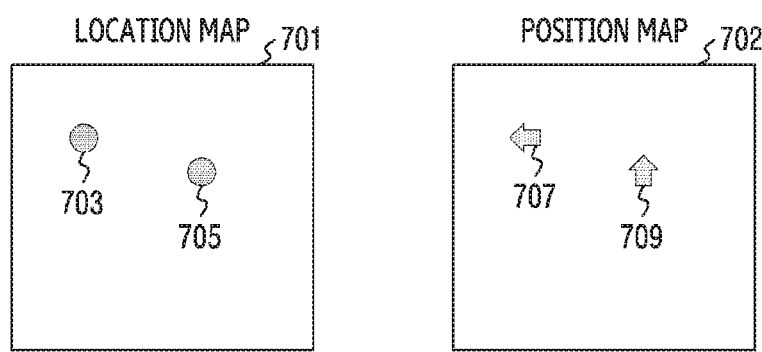
FIG. 7 illustrates an example of a location map and a position map acquired according to various embodiments.

Referring to FIG. 7, a location map 701 may show a location in which an object is put in the specified area 105. Each of two points (e.g., a first point 703 and a second point 705) shown on the location map 701 may represent the location in which the object is put. By acquiring the location information of the object by using the training data, the processor 220 may provide the location map 701. For example, the processor 220 may provide the location map 701 including a point corresponding to a location of an object within a range of the specified area 105 on the basis of the training data.

In operation 603, the processor 220 may provide a position map by acquiring positioning information by using the training data. By processing information on the specified area 105 acquired through the sensor on the basis of the training data, the processor 220 may provide the position map. The position map may include positioning information of an object included in the specified area 105.

In various embodiments, the processor 220 may acquire the positioning information of the object on the basis of previously stored training data. In accordance with embodiments, the processor 220 may update the training data in real time, and may acquire the positioning information of the object on the basis of the updated training data. The processor 220 may provide the position map on the basis of the positioning information. A description of the position map may refer to FIG. 7.

Referring to FIG. 7, a position map 702 may show a position of an object included in the specified area 105. Each of two arrows shown on the position map 702 may show a position in which an object is put. For example, a first arrow 707 of the position map 702 may represent a left direction. The first arrow 707 may represent that an object placed in a corresponding location of the first arrow 707 is located to face to a left direction. For another example, a second arrow 709 of the position map 702 may represent an up direction. The second arrow 709 may represent that an object placed in a corresponding location of the second arrow 709 is located to face to an up direction. A criterion of expression of an arrow (e.g., the first arrow 707 and the second arrow 709) for expressing a position of the object may be determined mutually differently according to a form or kind of the object. For example, in response to the object being a form of a screw nail, a direction of a head portion of the screw nail may be done as a direction of the arrow. For another example, in response to the object being the form of the screw nail, a direction of a tail portion of the screw nail may be done as the direction of the arrow.

In various embodiments, the first point 703 and the first arrow 707 may be information for representing respective location and position of the same object. The second point 705 and the second arrow 709 may be information for representing respective location and position of the same object.

In various embodiments, information (e.g., the first arrow 707 and the second arrow 709) constructing a position map in order to represent a position of an object may be expressed with a mathematical value. The information constructing the position map may include information on a pixel corresponding to a location of the object within the specified area 105. The mathematical value may include, for example, an Euler value for representing a direction of the first arrow 707, or a Quaternion value.

In various embodiments, the location map 701 or the position map 702 represent an embodiment of a location map or a position map which is providable by the processor 220, and is not limited to the aforementioned example. In accordance with embodiments, operation 601 and operation 603 may be performed simultaneously or irrespective of order.

In operation 605, the processor 220 may identify a location of the object and a position of the object on the basis of the location map and the position map. The processor 220 may identify the location of the object on the basis of the provided location map. For example, the processor 220 may acquire (or identify) information on a coordinate value at which the object is located, on the basis of the provided location map. For another example, the processor 220 may identify the location of the object on the basis of an algorithm (or formula) for finding a local peak of the object. The algorithm for finding the local peak may include, for example, a non-linear Gaussian fitting scheme. The processor 220 may acquire (or identify) a position value of the position of the object on the basis of the provided position map. For example, the processor 220 may acquire (or identify) a position value related to a yaw of the object, on the basis of the provided position map. For another example, the processor 220 may acquire a value of an angle at which the object is inclined with respect to a y axis, on the basis of the provided location map. In accordance with embodiments, a scheme of showing the position may differ, and the position value may be expressed with information on an n-dimensional image according to the scheme of showing the position.

In operation 607, the processor 220 may perform training related to the provision of the location map or the provision of the position map by using label information. The processor 220 may perform the training by using the label information on the basis of an artificial intelligence algorithm (below, a second artificial intelligence algorithm).

In various embodiments, the processor 220 may update an operation of the processor 220 for identifying an object by using the labeling information on the basis of the second artificial intelligence algorithm. The processor 220 may update an error related to identifying of the object by regressing the location map or position map on the basis of the second artificial intelligence algorithm. For example, the processor 220 may update an operation related to the provision of the location map or position map, by presenting, as the answer, a predetermined result value of an operation of the processor 220 identifying an object on the basis of the regression.

In various embodiments, the processor 220 may be difficult to express a location of an object having a predetermined size in the form of an exact number in association with information acquired through the sensor 140. By processing at least one operation related to the object by using a probability map (e.g., a location map and a position map), the processor 220 may minimize an error of the location of the object or a position. By using the probability map, the processor 220 may acquire a coordinate value of the location of the object or a position value of the position of the object.

The label information may include data for identifying an object previously provided by the processor 220 or the external device. The label information may include location label information related to a location of the object or position label information related to a position of the object. The label information may include, for example, reference data for performing training through an artificial intelligence algorithm by presenting a feedback to the processor 220.

In various embodiments, the processor 220 may provide the label information on the basis of obtaining a user input. The label information may include information on a result value provided on the basis of obtaining a plurality of user inputs about a location of an object. The label information may include information on a result value provided on the basis of obtaining a plurality of user inputs about a position of the object. A description related to the label information will be made later through FIG. 10 or FIG. 11.

In various embodiments, operation 605 and operation 607 may be performed simultaneously or irrespective of order. For example, the processor 220 may perform the training for the provision of the location map and the position map by using the label information, concurrently with identifying the location of the object and the position of the object on the basis of the location map and the position map.

Figure 8:
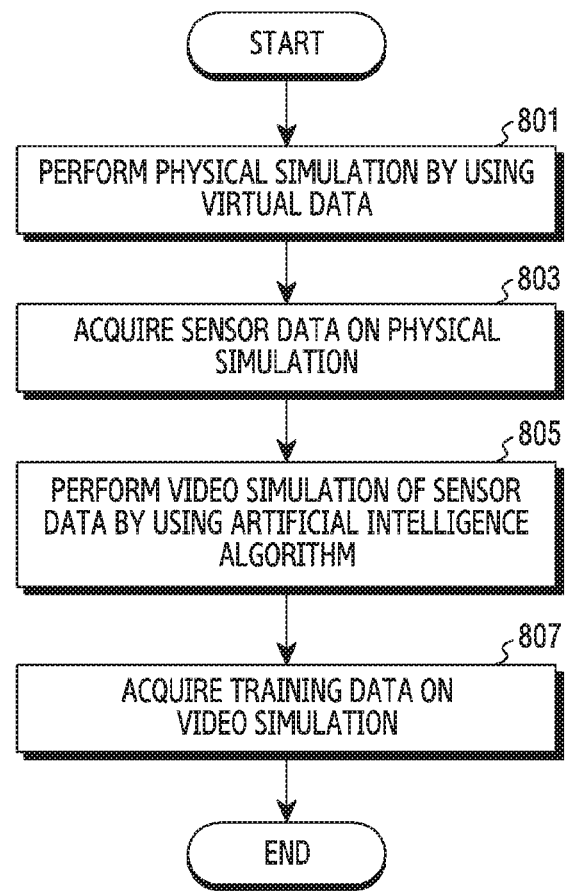
FIG. 8 illustrates an example of an operation of an electronic device for acquiring of training data according to various embodiments.

FIG. 8 illustrates an example of an operation of an electronic device for acquiring of training data according to various embodiments. FIG. 8 may show an example of an operation of the processor 220 providing a training database which is used to identify an object. In accordance with embodiments, at least some of operation 801 to operation 807 of FIG. 8 may be carried out by the external device. In this case, the processor 220 may acquire (or provide) training data on the basis of coupling with the external device.

Referring to FIG. 8, in operation 801, the processor 220 may perform physical simulation by using virtual data. The processor 220 may perform the physical simulation for virtual data on an object, on the basis of a physical simulator. The virtual data may include, in a two-dimensional image for showing one object, three-dimensional data that is provided on the basis of at least one of a light source, a location, a color, a form, and/or a shape. A description of the virtual data may refer to FIG. 9.

Figure 9:
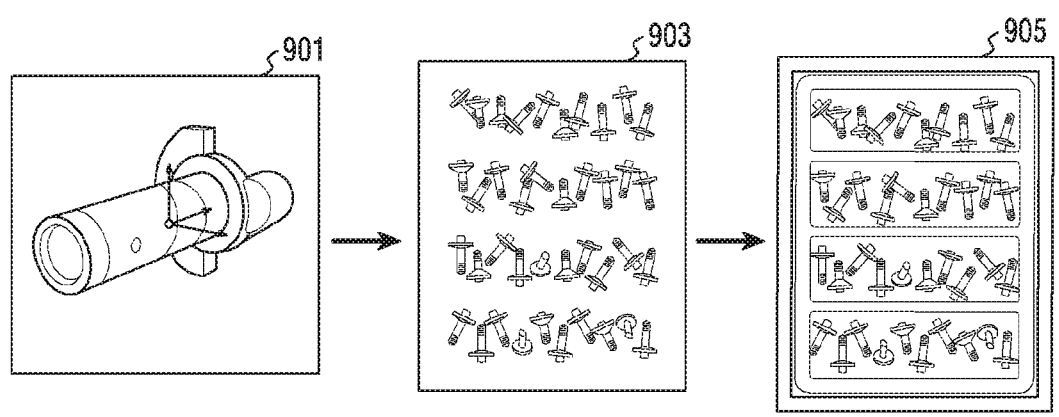
FIG. 9 illustrates an example of information related to training data according to various embodiments.

Referring to FIG. 9, in various embodiments, the virtual data may include an image 901. The virtual data may include information for representing an object on the basis of real data on the object. For example, the virtual data may include information for representing at least one of a form of the object, a shape, or a size. In accordance with embodiments, the virtual data may include a three-dimensional image. Although not illustrated, for example, information on the image 901 may include size information of the object, shape information, or color information. By identifying the image 901, the processor 220 may acquire more detailed information related to the object. For example, the processor 220 may identify a size of the object, a shape of the object, or a color of the object.

In various embodiments, the processor 220 may perform physical simulation by using virtual data on an object. The physical simulation may include at least one operation for acquiring realistic information on the object by using various physical numeric values. The physical numeric value may include, for example, information on at least one of a mass, a frictional force, inertia, or a speed. The processor 220 may simulate actual situations related to the object by using a physical numeric value about the object, on the basis of a physical simulator. The physical simulator may be hardware or software of the electronic device 101 for simulating a physical system. The physical system may include a system related to, for example, optics, rigid dynamics, fluid dynamics, dynamics, or statistics.

In operation 803, the processor 220 may acquire (or provide) sensor data on the physical simulation. The processor 220 may acquire the sensor data, on the basis of identifying the virtual data. For example, the processor 220 may acquire the sensor data on the basis of the physical simulation having the virtual data as an input. In this case, the sensor data may correspond to an output value of the physical simulation. A description of the sensor data may refer to FIG. 9.

Referring to FIG. 9, in various embodiments, the processor 220 may acquire sensor data (e.g., an image 903) on the basis of the virtual data (e.g., the image 901). By performing the physical simulation on the basis of the virtual data, the processor 220 may acquire sensor data on a plurality of objects. The processor 220 may acquire the sensor data on the plurality of objects on the basis of the virtual data and the various physical numeric values. The processor 220 may acquire the sensor data by applying the physical numeric value to each of the plurality of objects. The sensor data may include the image 903 of a form most similar with reality. For example, the sensor data may include the image 903 showing that the plurality of objects are arranged arbitrarily.

In operation 805, the processor 220 may perform video simulation for the sensor data by using an artificial intelligence algorithm. The processor 220 may perform the video simulation for the sensor data, on the basis of a video simulator (or a video based simulator) related to the artificial intelligence algorithm. The processor 220 may perform the video simulation by using real data related to the object and the sensor data. In some embodiments, the real data related to the object may include real information on the object, which is previously acquired through the sensor 140 included in the electronic device 101. In other some embodiments, the real data related to the object may include real information on the object included in the specified area 105, which is acquired in real time through the sensor 140 included in the electronic device 101. The information on the object included in the specified area 105 may be real data, and may be updated in real time according to circumstances. In other some embodiments, the real data related to the object may include real information on the object, which is received from the external device.

In operation 807, the processor 220 may acquire training data on the video simulation. By performing the video simulation, the processor 220 may provide an image (e.g., training data) similar with reality related to the object. A description of the training data may refer to FIG. 9.

Referring to FIG. 9, in various embodiments, the processor 220 may acquire training data (e.g., an image 905) on the basis of the sensor data (e.g., the image 903). By performing the video simulation by using the sensor data, the processor 220 may acquire (or provide) training data on a plurality of objects. The training data may include the image 905 showing the plurality of objects included in the specified area 105. By video-simulating the image 903, the processor 220 may acquire the image 905 for more realistically showing the plurality of objects.

Although not illustrated, in various embodiments, the processor 220 may acquire real data through various paths. The processor 220 may acquire the training data on the plurality of objects on the basis of the acquired real data and sensor data. By processing the sensor data on the plurality of objects on the basis of the real data, the processor 220 may acquire the training data. An operation of processing the sensor data may be carried out based on the artificial intelligence algorithm.

In various embodiments, the artificial intelligence algorithm (below, the first artificial intelligence algorithm) may include various algorithms for providing more accurate training data by reflecting the real data on the sensor data. For example, the first artificial intelligence algorithm may include GMM, AE, or GAN. In accordance with embodiments, the first artificial intelligence algorithm may be distinguished from (or different from) the artificial intelligence algorithm of operation 607 of FIG. 6.

In various embodiments, the first artificial intelligence algorithm may include a provision module for providing first data for representing an object on the basis of sensor data and a distinction module for distinguishing the first data from real data related to the object. The provision module may train in a direction of providing the first data wherein the first data and the real data are not distinguished from each other. The distinction module may train to distinguish a difference of the first data provided through the provision module and the inputted real data. On the basis of the training through the provision module and the distinction module, the processor 220 may provide second data (e.g., training data) about the first artificial intelligence algorithm. In accordance with embodiments, the processor 220 may perform the training which is based on the first artificial intelligence algorithm by using previously stored data related to the real data or virtual data.

In various embodiments, the processor 220 may provide training data on the basis of the first artificial intelligence algorithm. For example, the processor 220 may identify the sensor data and the real data on the basis of the first artificial intelligence algorithm. The processor 220 may identify an error (or a difference) between the sensor data and the real data. The identified error may include, for example, an error related to a physical numeric value, an error related to illumination (or light, or shadow), or an error related to the sensor 140. By using the error, the processor 220 may perform training (or learning) for providing the training data similarly with reality. The provided training data may include data which reflect actual numeric values about the sensor data, and which are provided similarly with reality.

In accordance with embodiments, the image 901, 903, or 905 of FIG. 9 may be expressed in a format (e.g., a video, or a moving image) for showing visual information, and is not limited to the aforementioned example.

Figure 10:
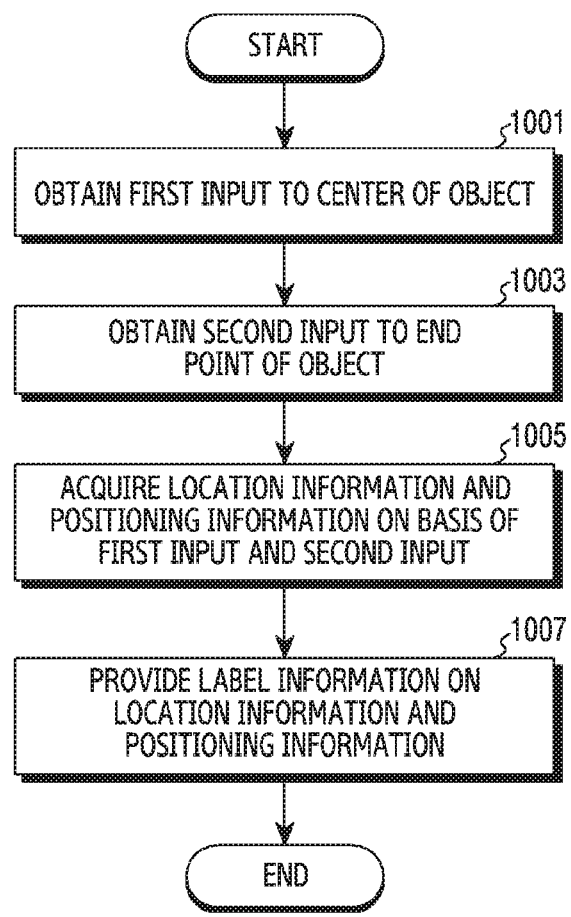
FIG. 10 illustrates an example of an operation of an electronic device for providing label information according to various embodiments.

FIG. 10 illustrates an example of an operation of an electronic device for providing label information according to various embodiments. FIG. 10 may show an example of an operation of the processor 220 for providing the label information related to operation 607 of FIG. 6. In accordance with embodiments, at least some of operation 1001 to operation 1007 of FIG. 10 may be carried out by the external device. In this case, the processor 220 may acquire (or provide) the label information on the basis of coupling with the external device.

Referring to FIG. 10, in operation 1001, the processor 220 may obtain a first input to the center of an object. The processor 220 may obtain an input of a user (or a user input) to one object included in the specified area 105. The input of the user may include the first input for representing the center of the object. A description related to the first input will be made later through a description of FIG. 11.

In operation 1003, the processor 220 may obtain a second input to an end point of the object. The processor 220 may obtain an input of a user to one object included in the specified area 105. The input of the user may include the second input for representing the end point of the object. The end point of the object may include another point (or feature point) of the object distinguished from the center of the object. The end point of the object may be different according to an embodiment, and is not limited to the aforementioned example in the present disclosure. A description related to the second input will be made later through a description of FIG. 11. In accordance with embodiments, operation 1001 and operation 1003 may be carried out simultaneously or irrespective of order.

Figure 11:
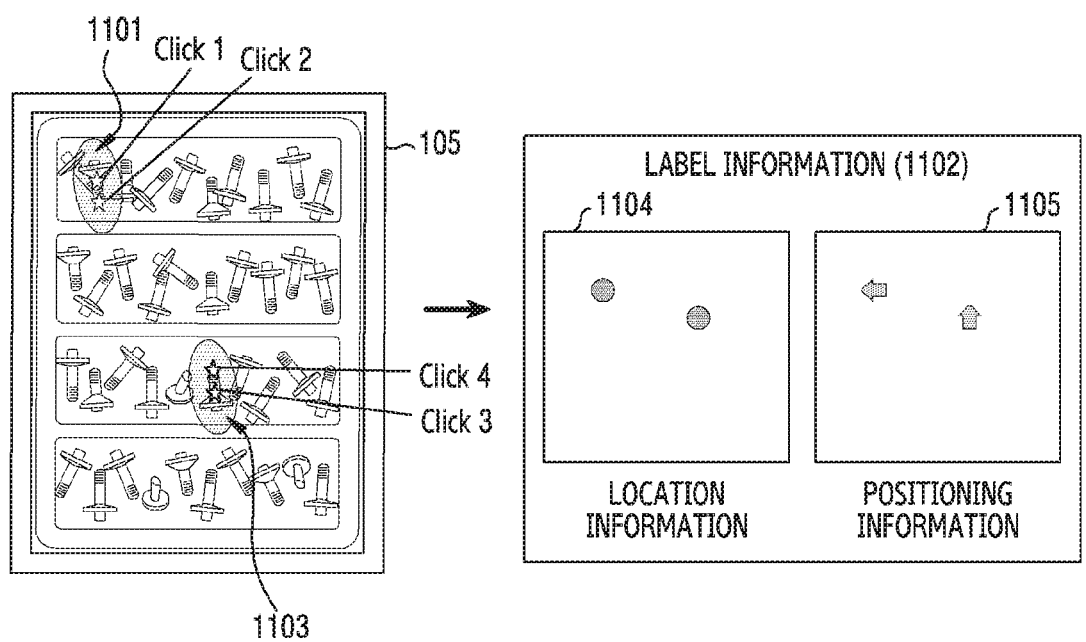
FIG. 11 illustrates an example of label information according to various embodiments.

Referring to FIG. 11, the processor 220 may obtain an input of a user to the center or end point of at least one object among a plurality of objects included in the specified area 105. The processor 220 may obtain an input (below, a first input) (e.g., click 1) to the center of a first object 1101 included in the specified area 105. In various embodiments, the first input may include an input of a user for representing a location of the first object 1101. The first input may be at least one of, for example, a click of a user on the center of an object, a double click, a long click, or a touch input. The first input may include various inputs related to a point for representing a location of the object, and is not limited to the aforementioned example. A form, shape, or color of the object is not limited to the illustrated example and, in accordance with an embodiment, a point for obtaining the first input may be varied according to the object. For example, in response to the object being a right triangle shape, the point for obtaining the first input may be a point corresponding to at least one vertex of the object.

The processor 220 may obtain an input (below, a second input) (e.g., click 2) to an end point of the first object 1101 included in the specified area 105. In various embodiments, the second input may include an input of a user for representing a position of the first object 1101. The second input may be at least one of, for example, a click of a user on an end point of an object, a double click, a long click, or a touch input. The second input may include, for another example, an input of dragging from the center of the object to the end point of the object. The second input may include various inputs related to a point (or a point or feature point) for representing a position of the object, and is not limited to the aforementioned example. A form, shape, or color of the object is not limited to the illustrated example and, in accordance with an embodiment, a point for obtaining the second input may be varied according to an external shape of the object. For example, in response to the object being a form of a screw nail, the point for obtaining the second input may be a head portion of the object.

In various embodiments, the processor 220 may additionally obtain inputs to the centers or end points of at least two objects among a plurality of objects included in the specified area 105. In some embodiments, after obtaining inputs (e.g., click 1 and click 2) of a user to the center or end point of the first object 1101, the processor 220 may obtain inputs (e.g., click 3 and click 4) of the user to the center and end point of a second object 1103. In other some embodiments, after obtaining the input (e.g., click 1) of the user to the center of the first object 1101 and the input (e.g., click 3) of the user to the center of the second object 1103, the processor 220 may obtain the input (e.g., click 2) of the user to the end point of the first object 1101 and the input (e.g., click 4) of the user to the end point of the second object 1103. The processor 220 may obtain the inputs of the user to the second object 1103 as an operation corresponding to an operation of obtaining the inputs of the user to the first object 1101.

In operation 1005, the processor 220 may acquire location information and positioning information on the basis of the first input and the second input. The processor 220 may acquire location information on the object on the basis of the first input. The location information may include information for representing a location of the object within the specified area 105. In an embodiment, the processor 220 may acquire information on a coordinate value (e.g., an x-axis value (or an x coordinate value) and a y-axis value (or a y coordinate value) for representing a location of the object on an xy plane on the basis of the first input. The processor 220 may acquire positioning information on the object on the basis of the second input. The positioning information may include information for representing a position of the object located within the specified area 105. In an embodiment, the processor 220 may acquire information on a yaw for representing a position of the object on the basis of the second input.

In various embodiments, the processor 220 may provide the location information or the positioning information in the form of visual information. For example, the processor 220 may provide the location information or the positioning information to correspond to image information expressed with a map. For another example, the processor 220 may provide the location information or the positioning information to correspond to video information expressed with a map. A description related to the location information or the positioning information will be made later through FIG. 11.

In operation 1007, the processor 220 may provide label information about the location information and the positioning information. The processor 220 may provide the label information on the basis of the acquired location information and/or the acquired positioning information. The label information may denote a database which includes the location information of the object and the positioning information of the object.

Although not illustrated, the processor 220 may store the provided label information in the memory 230. In accordance with embodiments, the processor 220 may store the label information in a training database within the memory 230. A description related to the label information will be made later through FIG. 11.

Referring to FIG. 11, the processor 220 may provide label information 1102 on the basis of information on the first object 1101 and the second object 1103. The label information 1102 may include location information 1104 on the first object 1101 and the second object 1103 and/or positioning information 1105 on the first object 1101 and the second object 1103.

The location information 1104 may include information for representing a point where the first object 1101 or the second object 1103 is located in a specific area corresponding to the specified area 105. The location information 1104 may include a circle for each representing the point where the first object 1101 or the second object 1103 is located, or a Gaussian function. The location information 1104 is not limited to the illustrated example, and may be constructed with various information for expressing a location of the object. For example, assuming that the first object 1101 or the second object 1103 is put on an xy plane, the location information 1104 may include information (e.g., a coordinate value, and a reliability degree of a location coordinate) for representing an x-axis coordinate and y-axis coordinate of the first object 1101 or the second object 1103.

The positioning information 1105 may include information for representing a position of the first object 1101 or the second object 1103 within a specific area corresponding to the specified area 105. For example, the positioning information 1105 related to the first object 1101 may include information for representing that the first object 1101 is located from right to left. For another example, the positioning information 1105 related to the second object 1103 may include information for representing that the second object 1103 is located from down to up. The positioning information 1105 is not limited to the illustrated example, and may be constructed with various information for representing a direction of an object. For example, the positioning information 1105 may include information (e.g., an angle value) for representing an angle at which the first object 1101 or the second object 1103 is inclined from one axis related to the specified area 105.

In various embodiments, the processor 220 may acquire minimum information required for picking of an object on the basis of a first input and a second input. The minimum information may include, for example, an x-axis value, a y-axis value, and a yaw value among six values (e.g., the x-axis value, the y-axis value, a z-axis value, the yaw value, a roll value, and a pitch value) of six degrees of freedom. In accordance with embodiments, the x-axis value and the y-axis value may be the minimum information for representing a location of the object. The yaw value may be the minimum information for representing a position of the object.

In various embodiments, the processor 220 may acquire the minimum information. On the basis of acquiring the minimum information, an unnecessary operation related to the processor 220 may be omitted. Through this, the implementation of an efficient bin-picking system is possible.

A method of an electronic device of various embodiments may include acquiring data on a specified area including at least one object by using the at least one sensor, identifying location information and positioning information on the at least one object, on the basis of a training database which includes data on the at least one object acquired on the basis of an artificial intelligence algorithm, and transmitting a control signal for picking the at least one object to a picking tool related to the electronic device, on the basis of the identified location information and positioning information.

In various embodiments, the at least one sensor 140 may include a sensor for measuring at least one of whether the at least one object is included in the specified area, a shape of the at least one object, a location of the at least one object, and a position of the at least one object.

In various embodiments, the data on the specified area may include information representing an image related to the specified area.

In various embodiments, the location information of the at least one object may include at least one of an x-axis value, a y-axis value, or a z-axis value on the specified area of the at least one object, and the positioning information of the at least one object may include at least one of information on a yaw of the at least one object, information on a roll, or information on a pitch.

In various embodiments, the location information of the at least one object may include an x-axis value and a y-axis value on the specified area of the at least one object, and the positioning information of the at least one object may include information on a yaw of the at least one object.

In various embodiments, the method of the electronic device 101 may further include providing a location map representing the location information, on the basis of the identified location information of the at least one object, and providing a position map representing the positioning information, on the basis of the identified positioning information of the at least one object. In some embodiments, the method of the electronic device 101 may further include providing the location map and the position map, on the basis of the artificial intelligence algorithm. In other embodiments, the method of the electronic device 101 may further include transmitting a control signal for picking the at least one object to the picking tool 110 related to the electronic device 101, on the basis of the provided location map and the provided position map.

In various embodiments, the method of the electronic device 101 may further include processing the data on the specified area, the location information of the at least one object, and the positioning information, on the basis of the artificial intelligence algorithm, and updating the training database on the basis of the processing.

In various embodiments, the training database may include the location information of the at least one object, the positioning information of the at least one object, and video information of the at least one object, and the video information may includes virtual data representing the at least one object, and information provided on the basis of the artificial intelligence algorithm.

A non-transitory computer-readable storage medium of various embodiments may store one or more programs for executing acquiring data on a specified area including at least one object by using at least one sensor 140, identifying location information and positioning information on the at least one object, on the basis of a training database which includes data on the at least one object acquired on the basis of an artificial intelligence algorithm, and transmitting a control signal for picking the at least one object to a picking tool 110 related to an electronic device, on the basis of the identified location information and positioning information.

While a detailed description of the present disclosure has been made for a concrete embodiment, it is undoubted that various modifications are available without departing from the scope of the present disclosure. Therefore, the scope of the present disclosure should not be limited to and defined by the described embodiment and should be defined by not only claims mentioned below but also equivalents to these claims.

And, embodiments disclosed in the specification and drawings merely suggest specific examples so as to easily explain the substance of the present disclosure and help understanding, and do not intend to limit the scope of the present disclosure. Accordingly, the scope of the present disclosure should be construed as including, besides the embodiments disclosed herein, all modified or changed forms that are drawn on the basis of the technological spirit of the present disclosure.

What is claimed is:

1. An electronic device comprising:
at least one sensor;
a memory configured to store instructions and a training database, the training database comprising training data on an object obtained by processing simulated sensor data for an arrangement of multiple ones of the object based on a first artificial intelligence algorithm; and
a processor coupled with the at least one sensor and the memory,
wherein the processor is configured to execute the instructions to cause the electronic device to:
obtain virtual data representing a form and a shape of the object;
obtain sensor data by performing a physical simulation to the virtual data, wherein the physical simulation includes at least one operation for acquiring realistic information on the object by using physical numeric values;
perform a video simulation to the sensor data obtained by the physical simulation and real data related to the object, based on the first artificial intelligence algorithm;
obtain the training data by performing the video simulation;
acquire data on a specified area including a plurality of instances of the object, using the at least one sensor;
identify location information and positioning information on at least one object of the plurality of instances of the object included in the specified area, based on a second artificial intelligence algorithm using the training data in the training database;
provide a location map, based on the identified location information, wherein the location map comprises at least one point representing a location in which the at least one object is put within the specified area;
provide a position map, based on the identified positioning information, wherein the position map comprises at least one arrow representing a direction in which the at least one object is put; and
transmit a control signal for picking the at least one object to a picking tool, based on the location map and the position map.

2. The electronic device of claim 1, wherein the at least one sensor comprises a sensor configured to sense at least one of whether the object is included in the specified area, a shape of the object, a location of the object, or a position of the object.

3. The electronic device of claim 1, wherein the data on the specified area comprises image information of an image related to the specified area.

4. The electronic device of claim 1, wherein the location information of the at least one object comprises at least one of an x-axis value, a y-axis value, or a z-axis value, on the specified area, of the at least one object, and
the positioning information of the at least one object comprises at least one of information on a yaw of the at least one object, information on a roll of the at least one object, or information on a pitch of the at least one object.

5. The electronic device of claim 1, wherein the instructions further cause the electronic device to:
provide the location map and the position map, based on the second artificial intelligence algorithm.

6. The electronic device of claim 1, wherein the instructions further cause the electronic device to:
process the data on the specified area, the location information of the at least one object, and the positioning information of the at least one object, based on the second artificial intelligence algorithm; and
update the training database based on the processing, and
wherein the training database comprises the location information of the at least one object, the positioning information of the at least one object, and video information of the at least one object, and
the video information comprises virtual data representing the at least one object, and information provided based on the second artificial intelligence algorithm.

7. A method of an electronic device, the method comprising:
obtaining a training database, the training database comprising training data on an object obtained by processing simulated sensor data for an arrangement of multiple ones of the object based on a first artificial intelligence algorithm;
obtaining virtual data representing a form and a shape of the object;
obtaining sensor data by performing a physical simulation to the virtual data, wherein the physical simulation includes at least one operation for acquiring realistic information on the object by using physical numeric values;
performing a video simulation to the sensor data obtained by the physical simulation and real data related to the object, based on the first artificial intelligence algorithm, wherein the training data is obtained by performing the video simulation;
acquiring data on a specified area including a plurality of instances of the object, using at least one sensor;
identifying location information and positioning information on at least one object of the plurality of instances of the object included in the specified area, based on a second artificial intelligence algorithm using the training data in the training database;
providing a location map, based on the identified location information, wherein the location map comprises at least one point representing a location in which the at least one object is put within the specified area;
providing a position map, based on the identified positioning information, wherein the position map comprises at least one arrow representing a direction in which the at least one object is put; and
transmitting a control signal for picking the at least one object to a picking tool, based on the location map and the position map.

8. The method of claim 7, wherein the at least one sensor comprises a sensor configured to sense at least one of whether the object is included in the specified area, a shape of the object, a location of the object, or a position of the object.

9. The method of claim 7, wherein the data on the specified area comprises image information of an image related to the specified area.

10. The method of claim 7, wherein the location information of the at least one object comprises at least one of an x-axis value, a y-axis value, or a z-axis value on the specified area of the at least one object, and
the positioning information of the at least one object comprises at least one of information on a yaw of the at least one object, information on a roll of the at least one object, or information on a pitch of the at least one object.

11. The method of claim 10, further comprising:

processing the data on the specified area, the location information of the at least one object, and the positioning information of the at least one object, based on the second artificial intelligence algorithm; and updating the training database based on the processing, wherein the training database comprises the location information of the at least one object, the positioning information of the at least one object, and video information of the at least one object, and the video information comprises virtual data representing the at least one object, and information provided based on the second artificial intelligence algorithm.

12. The method of claim 7, further comprising:

providing the location map and the position map, based on the second artificial intelligence algorithm.

13. A non-transitory computer-readable storage medium for storing one or more programs which, when executed by a processor of an electronic device, cause the electronic device to:

obtain a training database, the training database comprising training data on an object obtained by processing simulated sensor data for an arrangement of multiple ones of the object based on a first artificial intelligence algorithm;

obtain virtual data representing a form and a shape of the object;

obtain sensor data by performing a physical simulation to the virtual data, wherein the physical simulation includes at least one operation for acquiring realistic information on the object by using physical numeric values;

perform a video simulation to the sensor data obtained by the physical simulation and real data related to the object, based on the first artificial intelligence algorithm, wherein the training data is obtained by performing the video simulation;

acquire data on a specified area including a plurality of instances of the object, using at least one sensor;

identify location information and positioning information on at least one object of the plurality of instances of the object included in the specified area, based on a second artificial intelligence algorithm using the training data in the training database;

provide a location map, based on the identified location information, wherein the location map comprises at least one point representing a location in which the at least one object is put within the specified area;

provide a position map, based on the identified positioning information, wherein the position map comprises at least one arrow representing a direction in which the at least one object is put; and transmit a control signal for picking the at least one object to a picking tool, based on the location map and the position map.

* * * * *